United States Patent [19]

Tagawa et al.

[11] Patent Number: 5,056,581

[45] Date of Patent: Oct. 15, 1991

[54] METHOD FOR FORMING AN ASSEMBLY OF ONE-WAY CLUTCH RING AND ITS HOUSING

[75] Inventors: Akira Tagawa, Chigasaki; Mikio Uchida, Yamato; Akihiro Ishida, Fujisawa, all of Japan

[73] Assignee: NSK-Warner Kabushiki Kaisha, Tokyo, Japan

[21] Appl. No.: 441,505

[22] Filed: Nov. 27, 1989

[30] Foreign Application Priority Data

Nov. 25, 1988 [JP] Japan ................. 63-152539[U]

[51] Int. Cl.$^5$ .................. B22D 19/00; B22D 19/08
[52] U.S. Cl. ....................... 164/100; 164/98; 164/105
[58] Field of Search ............. 164/100, 101, 102, 103, 164/104

[56] References Cited

U.S. PATENT DOCUMENTS

| | | | |
|---|---|---|---|
| 1,153,197 | 9/1915 | Craig | 164/103 |
| 1,807,689 | 6/1931 | Deputy | 164/103 |
| 2,085,726 | 7/1937 | Campbell | 164/103 |
| 3,276,082 | 10/1966 | Thomas | 164/103 |
| 4,621,674 | 11/1986 | Kaiser | 164/103 |

FOREIGN PATENT DOCUMENTS

| | | | |
|---|---|---|---|
| 846079 | 7/1981 | U.S.S.R. | 164/102 |
| 1250389 | 8/1986 | U.S.S.R. | 164/102 |

Primary Examiner—Richard K. Seidel
Assistant Examiner—Rex E. Pelto
Attorney, Agent, or Firm—Skjerven, Morrill, MacPherson, Franklin & Friel

[57] ABSTRACT

A method for manufacturing an assembly of an outer ring of a one-way clutch and a stator housing of a torque converter is provided. An outer ring is provided and its outer peripheral surface is subjected to a plastic deformation process, such as forging, to thereby form an up and down structure which extends from one side only halfway through to the outer side of the outer ring. Preferably, the main body of the outer ring is deformed such that side projections are formed at spaced intervals in a circumferential direction to thereby define a spline-like structure. Then, the outer ring is machined only at its inner peripheral surface and its side surface which is opposite to the side where the up and down structure is formed. Thus, the outer peripheral surface and the side surface where the up and down structure is formed are left unmachined. Then, a stator housing is formed either by molding or casting using the outer ring thus formed as an insert. Therefore, there is obtained an assembly of an outer ring of a one-way clutch and a stator housing having an integrated structure.

3 Claims, 5 Drawing Sheets

METHOD FOR FORMING AN ASSEMBLY OF ONE-WAY CLUTCH RING AND ITS HOUSING

BACKGROUND OF THE INVENTION

1. Field of the Invention

This invention generally relates to a method for manufacturing an assembly of one-way clutch and its housing, and, in particular, to a method for manufacturing an assembly of an either an inner or outer ring of a one-way clutch and its housing, such as a stator or a torque converter, and its resulting structure.

2. Description of the Prior Art

Referring first to FIG. 2, there is schematically shown the overall structure of a torque converter 2 to which the present invention can be advantageously applied. As shown, the torque converter 2 includes a drive plate 1 through which a drive power is transmitted to the torque converter 2 from a power source, such as an engine. The torque converter 2 also includes a pump impeller 3, a turbine runner 4, a stator 5, an output shaft 6, a stationary shaft 7, a power output gear 8, and a one-way clutch 11, which includes an outer ring 9, an inner ring 10 and a pair of retainers 12 and 13. The stator 5 is typically made of an Al alloy by die casting or injection molding, and the outer ring 9 is typically comprised of alloy steel or carbon steel for a mechanical structure.

FIGS. 3a through 3c show one prior art method for manufacturing an assembly of a one-way clutch and its housing. In this case, a plurality of inwardly projecting keys are formed on the inner surface of the stator 5, for example, by machining, such as broaching, and a plurality of key grooves 9a are formed in the outer peripheral surface of the outer ring 9, each extending axially from one side to the other, by machining or forging. Then, the outer ring 9 is fitted into the stator 5 with its key grooves 9a in alignment with the respective keys of the stator 5. According to this method, because of the fitting accuracies required for the outer diameter of outer ring 9 and the inner diameter of stator 5, the machining cost tends to be expensive. Besides, structurally, the outer ring 9 tends to be large in thickness so that the resulting structure becomes larger in diameter. Thus, it is not possible to make the entire structure compact in size, which is extremely disadvantageous.

FIGS. 4a through 4d show another prior art method for manufacturing an assembly of a one-way clutch and its housing. In accordance with this method, a smooth surface is provided in the inner peripheral surface of stator 5 and a serrated structure 9b is provided, for example, by knurling at the outer peripheral surface of outer ring 9 of a one-way clutch. Then, the outer ring 9 is press-fitted into the bore of the stator 5. As different from the previous approach, this method allows to provided a structure having a reduced outer diameter; however, there is a limit in making the thickness of stator 5 thinner because of possible breakage due to press-fitting process and this process tends to be expensive because of involvement of knurling and press-fitting processes.

In order to obviate the disadvantages of the above-described prior art methods, Japanese Patent Postexamination Pub. No. 63-18050 teaches to provide projections or grooves at one side of an outer ring of a one-way clutch and have this outer ring built into a stator when forming the stator by casting. However, in the resulting structure of this approach, a mechanical connection is present only at one side of the outer ring of a one-way clutch, so that its structural integrity is a relatively low level and its width tends to become excessive.

SUMMARY OF THE INVENTION

In accordance with the present invention, there is provided a method for manufacturing an assembly between a ring of a one-way clutch and its housing, which comprises the steps of: providing a ring blank having at least one peripheral surface; applying a plastic deformation to said peripheral surface to thereby provide ups and downs in said peripheral surface; and forming a housing using said ring as an insert to thereby have said ups and downs embedded between said ring and housing. In the preferred embodiment, the ups and downs are provided by forging. Preferably, the ring is locally dented by pressing to thereby form side projections which are also embedded when the housing is formed by casting or molding. A spline-like structure is preferably formed by the side projections. The ring may be either an outer or inner ring of a one-way clutch. And, the housing is preferably a housing of a torque converter. In the preferred embodiment, the ups and downs are provided such that they extend axially from one side of the ring halfway to the other side, and not extending from one side to the other.

In accordance with the present invention, it is only necessary to machine one peripheral surface and one side surface of a ring. Thus, the process is extremely simple and cheap. For example, when the present invention is applied to a process for forming an assembly of an outer ring of a one-way clutch and its housing, the accuracy required for the outer peripheral surface and side surface of the outer ring may be of the same order as that of a plastic deformation process or forging. Thus, the degree of machining required is reduced. In addition, the resulting structure of ups and downs formed on the outer peripheral surface of the outer ring are relatively rounded and lack sharp edges, the strength and integrity of the outer ring is not impaired because of the provision of irregular structure at its outer peripheral surface. Furthermore, a step for assembling an outer ring into a stator is carried out at the same time as the time when forming the stator by molding or casting so that the overall process is simplified. In the preferred embodiment, since the ups and downs are formed from one side to halfway through to the other side, it is only necessary to process the other side which will be exposed when the housing is molded or casted, and, therefore, it is not necessary to have a burr removing step.

It is therefore a primary object of the present invention to obviate the disadvantages of the prior art as described above and to provide a novel method for forming an assembly of a ring of a one-way clutch and its housing.

Another object of the present invention is to provide an improved method for forming an assembly of a one-way clutch and a housing of a torque converter.

A further object of the present invention is to provide an improved method for manufacturing an assembly between either an outer or inner ring of a one-way clutch and a housing of a torque converter.

Other objects, advantages and novel features of the present invention will become apparent from the following detailed description of the invention when con-

BRIEF DESCRIPTION OF THE DRAWINGS

FIG. 5b is taken on the line 5b—5b on FIG. 5a.
FIG. 5e is taken on the line 5e—5e in FIG. 5d.

DESCRIPTION OF THE PREFERRED EMBODIMENTS

Referring now to FIGS. 1a through 1e, there is shown a process for manufacturing an assembly of an outer ring of a one-way clutch assembly and a stator housing of a torque converter in accordance with one embodiment of the present invention. It is to be noted that although the following description will be given regarding a process for manufacturing an assembly between an outer ring of a one-way clutch and a stator housing, the present invention may be equally applicable to any other similar assembly, such as an assembly between an inner ring of a one-way clutch and a housing which houses the inner ring.

Figure 1A:
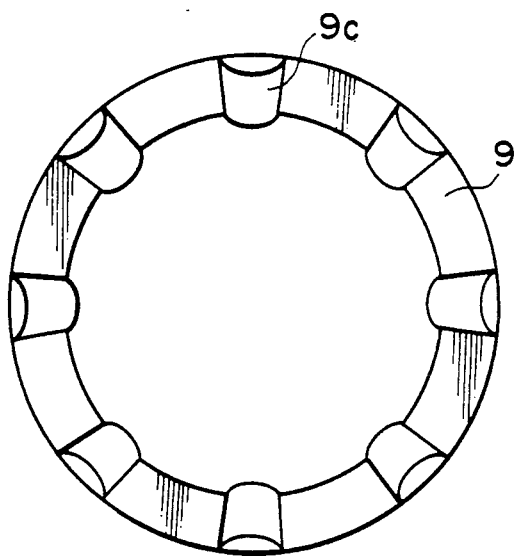
FIGS. 1a through 1e are schematic illustrations showing a process for forming an assembly of an outer ring of a one-way clutch assembly and a stator housing of a torque converter in accordance with one embodiment of the present invention.
Figure 1B:
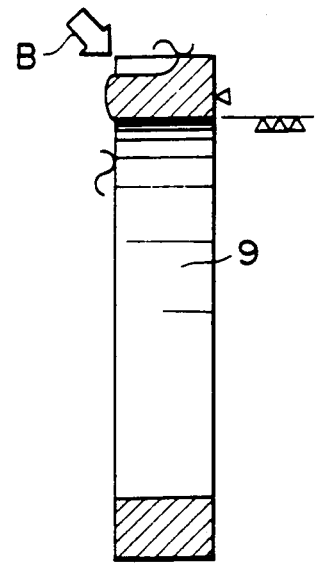
Figure 1C:
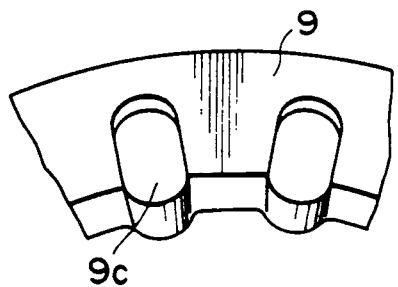
Figure 1D:
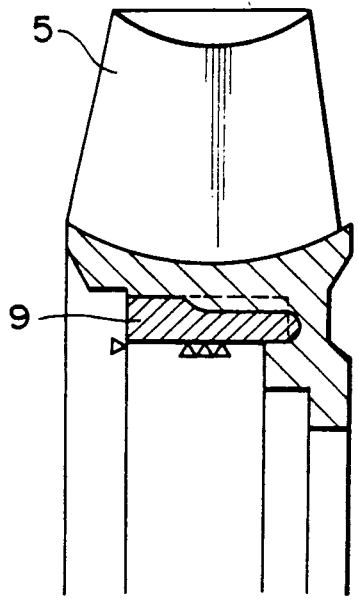
Figure 1E:
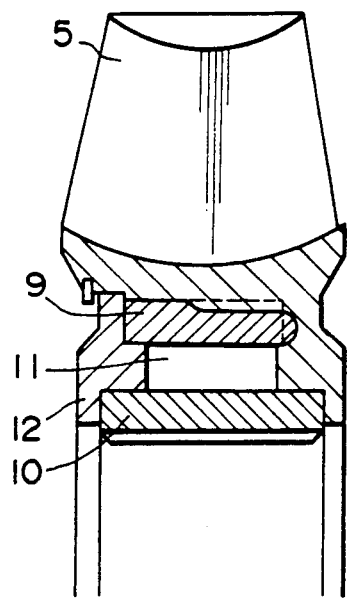
Figure 2:
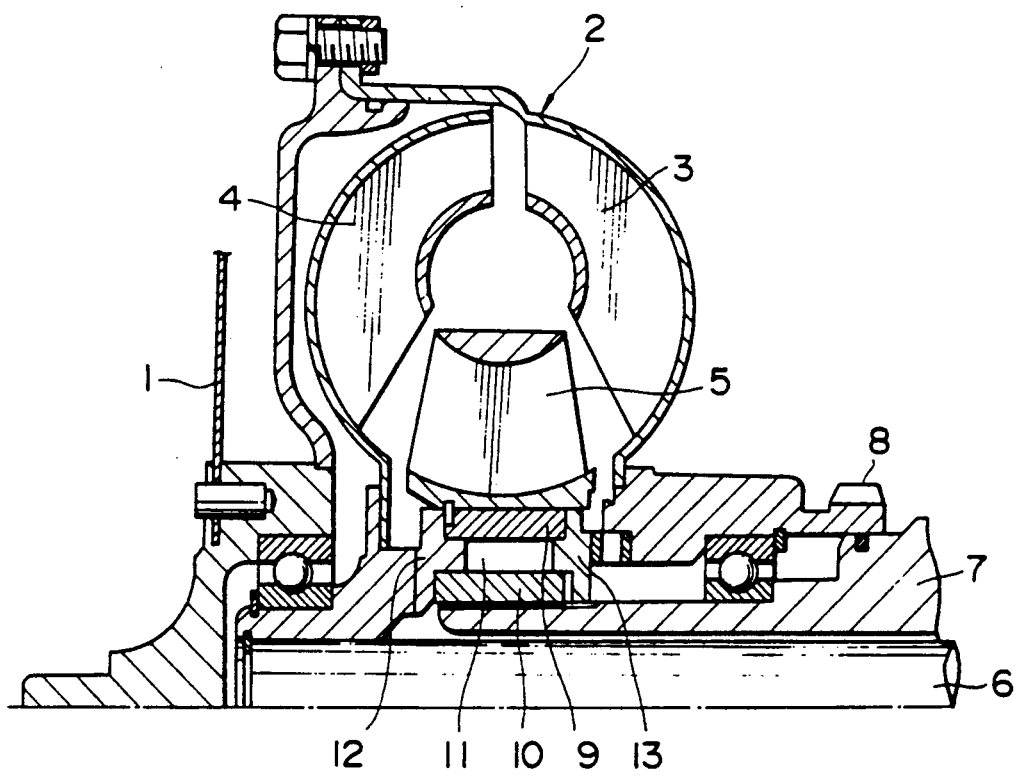
FIG. 2 is a schematic illustration showing the overall structure of a torque converter to which the present invention may be applied, advantageously.
Figure 3A:
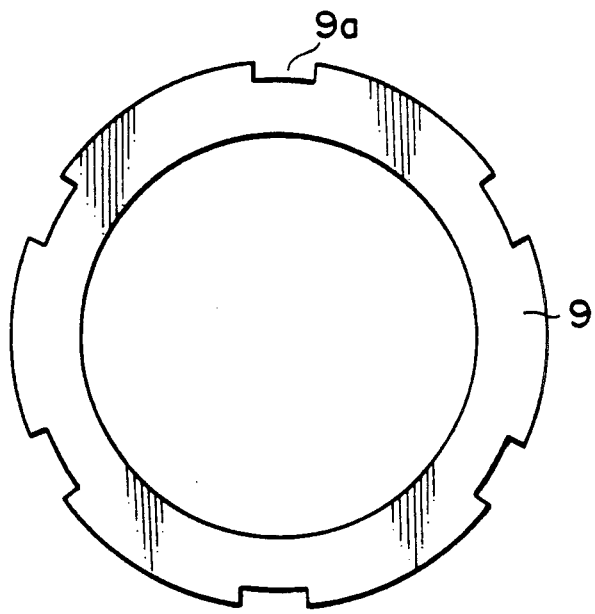
FIGS. 3a through 3c are schematic illustrations showing a process for forming an assembly of an outer ring of a one-way clutch and a stator housing of a torque converter in accordance with a typical prior art method.
Figure 3B:
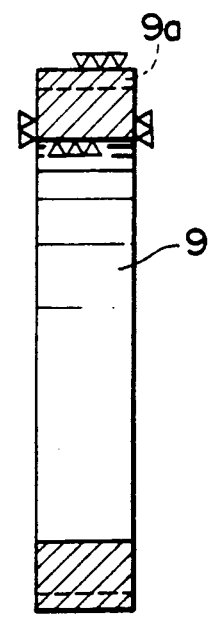
Figure 3C:
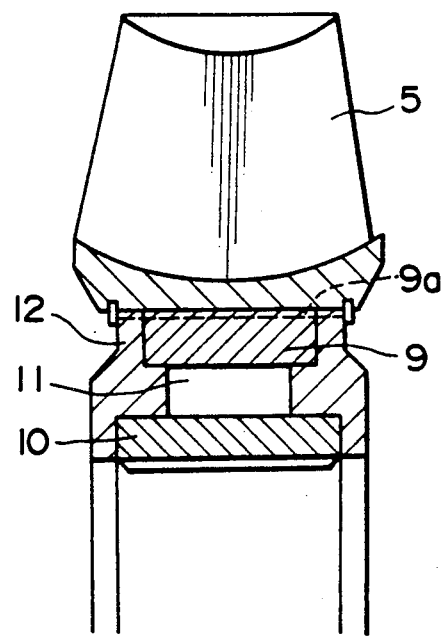
Figure 4A:
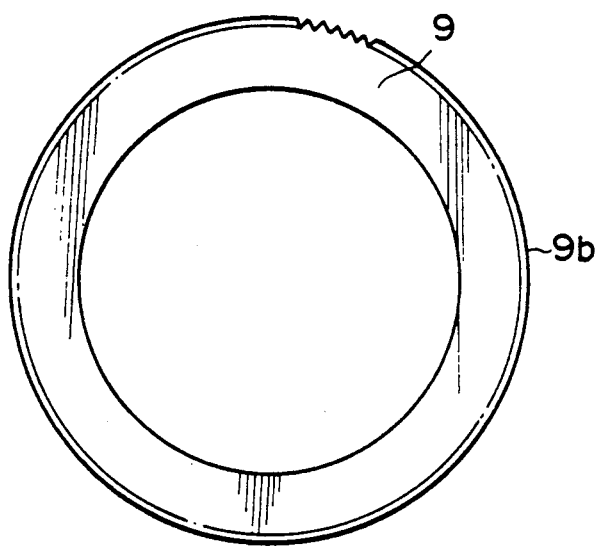
FIGS. 4a through 4d are schematic illustrations showing a process for forming an assembly of an outer ring of a one-way clutch assembly and a stator housing of a torque converter in accordance with another prior art method.
Figure 4B:
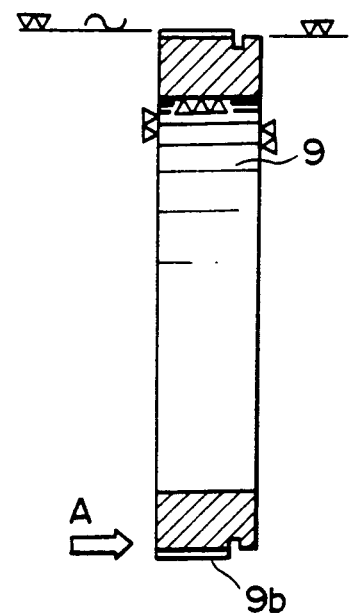
Figure 4C:
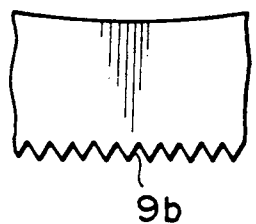
Figure 4D:
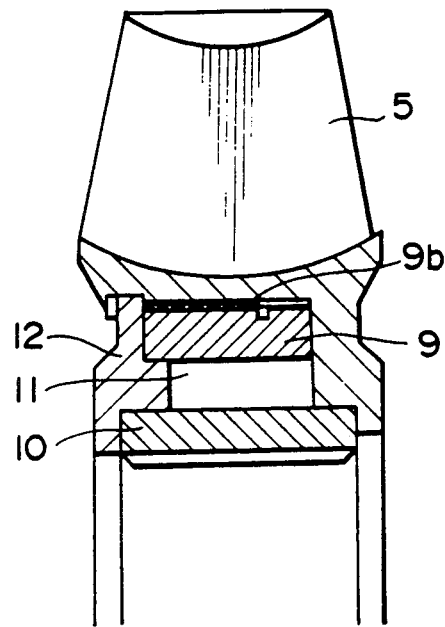

FIG. 1a illustrates in front view an outer ring 9 which has been subjected to a plastic deformation process to provide a desired structure. That is, as also shown in FIG. 1b, a plastic deformation has been applied to the outer peripheral surface of the outer ring 9 so that ups and downs are formed in the outer peripheral surface. In the present embodiment, dents 9c are formed in the outer peripheral surface of the outer ring 9 by forging at spaced intervals in the circumferential direction. Each of the dents 9c extend axially from one side of the outer ring 9 only halfway through to the other side and not completely to the other side. As best shown in FIG. 1c, the body of the outer ring 9 somewhat bulges to form local side projections when the dents 9c are formed by forging. As a result, a spline-like structure is formed at one side of the outer ring 9. As also shown in FIG. 1b, only the inner peripheral surface and the side surface of the outer ring 9 where the dents 9c are not formed are subjected to machining while leaving the outer peripheral surface and the side where the dents 9c are formed are left not subjected to machining.

Then, the outer ring 9 thus formed is used as an insert when forming a housing of a stator 5 by casting or molding so that the outer ring 9 is integrally formed when the housing of stator 5 is formed. In this case, the outer peripheral surface of the outer ring 9 and its side where the dents 9c are formed are covered by the stator housing. It is to be noted that as an alternative embodiment, the machining step of the outer ring 9 may be carried out after integration of the outer ring 9 and the stator housing, if desired. Anyway, since the outer ring 9 has dents 9c at its outer peripheral surface and the side projections, the resulting structure provides a mechanically strong connection between the two. Thus, a rotational force may be transmitted between the outer ring 9 and the stator housing relatively uniformly so that there is provided a stable force balance in transmission of rotating force.

Then, a sub-assembly including a one-way clutch 11, an inner ring 10 and a retainer 12 is inserted to provide a completed structure having an embedded one-way clutch. Any desired material, such as plastic and metals, may be used in forming the stator housing as long as it can be used in casting or molding.

Figure 5C:
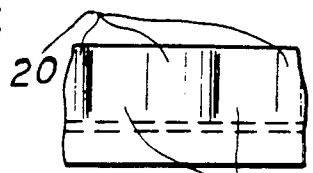
FIGS. 5a through 5e are schematic illustrations showing alternative embodiments of the present invention.
Figure 5A:
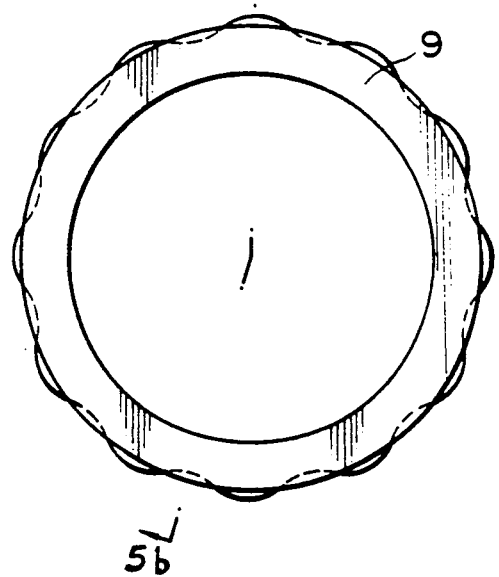
Figure 5B:
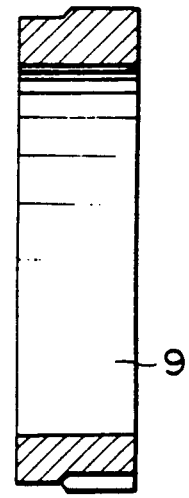

FIGS. 5a through 5c illustrate another embodiment of the present invention, in which ups and downs are formed on the outer peripheral surface of the outer ring 9 in the form of rolling hills or undulation. The up and down structure is provided only at the outer peripheral surface of the outer ring 9 extending from one side halfway through to the other side. In the illustrated embodiment, the left-hand axial half section has a constant outer diameter and the right-hand axial section has an undulating outer peripheral surface whose outer diameter varies periodically and sinusoidally above and below the constant outer diameter of the left-hand axial section. Such an up and down structure may be provided by any desired plastic deformation process, such as forging. Then, the outer ring 9 having the thus formed up and down structure is used as an insert in a step for forming a stator housing by molding or casting so that there results an intergated structure between the outer ring 9 and the stator housing when the stator housing is formed.

Figure 5D:
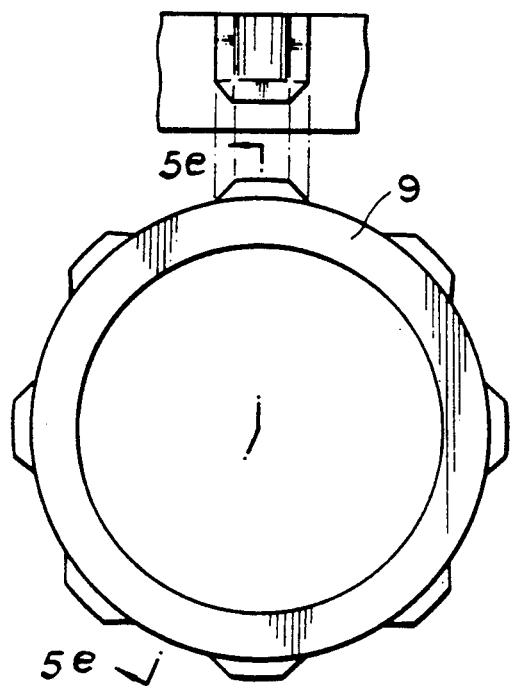
Figure 5E:
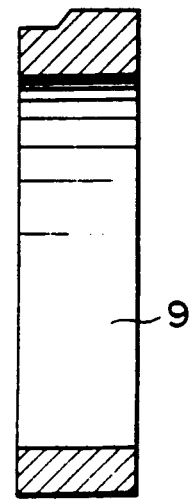

FIGS. 5d and 5e illustrate a further embodiment of the present invention, in which ridges are formed at spaced intervals at the right-hand axial section of the outer ring 9. Such an up and down structure may also be provided advantageously by any desired plastic deformation process. Then, the outer ring 9 having such an up and down structure is used as an insert in a step for forming a stator housing by casting or molding, so that there is obtained an integrated structure between the outer ring 9 and its housing. In either of these embodiments, it is not necessary to use machining to form an up and down structure at the outer peripheral surface of the outer ring 9 and any desired plastic deformation process, such as forging, may be used. The up peak 20 and down structure thus formed by forging or the like may be left as it is and it is not required to apply an additional step because the outer peripheral surface is eventually covered by its housing.

While the above provides a full and complete disclosure of the preferred embodiments of the present invention, various modifications, alternate constructions and equivalents may be employed without departing from the true spirit and scope of the invention. Therefore, the above description and illustration should not be constructed as limiting the scope of the invention, which is defined by the appended claims.

What is claimed is:

1. A method for manufacturing an assembly of a ring of a one-way clutch and a housing, comprising the steps of:

providing a ring having an axial outer peripheral surface;

forging an up and down structure at said peripheral surface which extends an axial distance from one side only halfway through to an opposite side by forming a spaced number of dents in said peripheral surface and thereby forming plastically deformed axial protrusions extending outwardly from said one side, said dents and said protrusions being formed by said forging step, said up and down structure having a varying diameter which varies periodically in a circumferential direction, a remaining axial portion of said peripheral surface defining a smooth cylindrical surface having a constant diameter; and forming a housing by molding or casting using said ring as an insert, thereby having said up and down structure and said axial protrusions embedded by said housing.

2. The method of claim 1, wherein said ring is an outer ring of a one-way clutch.

3. The method of claim 1, wherein said housing is a housing of a stator of a torque converter.

* * * * *